United States Patent [19]
Gordon

[11] Patent Number: 5,619,725
[45] Date of Patent: Apr. 8, 1997

[54] METHOD FOR AUXILIARY SOFTWARE PROVIDING INSTRUCTION FOR FACSIMILE MODEM TO SIMULATE A TELEPHONE COMMUNICATION WHILE CONNECTING TO STORE AND FORWARD COMPUTER TO RECEIVE COMMUNICATION

[75] Inventor: Alastair T. Gordon, Toronto, Canada

[73] Assignee: Alphanet Telecom Inc., Toronto, Canada

[21] Appl. No.: 183,935

[22] Filed: Jan. 21, 1994

[51] Int. Cl.$^6$ ........................................... G06F 3/00
[52] U.S. Cl. ..................... 395/839; 379/93; 375/222; 358/438
[58] Field of Search .................... 358/400, 402, 358/407, 492, 434, 438; 379/58, 94, 28, 93; 364/200, 222.2, 238.5, 284; 395/275, 834; 178/22; 370/32.1, 110.1; 375/222

[56] References Cited

U.S. PATENT DOCUMENTS

| | | | |
|---|---|---|---|
| 4,882,674 | 11/1989 | Quint et al. | 364/200 |
| 5,065,427 | 11/1991 | Godbole | 379/100 |
| 5,146,472 | 9/1992 | Hallman | 375/8 |
| 5,233,627 | 8/1993 | Kozima et al. | 375/8 |
| 5,291,302 | 3/1994 | Gordon et al. | 358/400 |
| 5,333,266 | 7/1994 | Boaz et al. | 395/200 |
| 5,452,289 | 9/1995 | Sharma et al. | 370/32.1 |

FOREIGN PATENT DOCUMENTS

| | | |
|---|---|---|
| 0516459 | 12/1992 | European Pat. Off. . |
| 2254525 | 10/1992 | United Kingdom . |
| 9506386 | 3/1995 | WIPO . |

OTHER PUBLICATIONS

BT Technology Journal, vol. 12, No. 1, Jan. 1994, Ipswich GB, pp. 34–43, R. Hunter et al. "Fax–on–demand systems for business and home applications".

Globecom '92, vol. 2, Dec. 1992, Orlando US, pp. 964–968, E. Chunk et al. "Implementation of a Fax Distribution System in the Local Area Networks pf PCs".

Primary Examiner—Thomas C. Lee
Assistant Examiner—Anderson I. Chen

[57] ABSTRACT

The present invention discloses a method and apparatus for retrieval of information from a remote computer by a PC equipped with a facsimile modem where the PC initiates the communication. The method and apparatus in a preferred embodiment take advantage of the standard fields associated with facsimile transmission for exchange of information. The invention also provides a simple arrangement for changing the transmit mode of a facsimile modem to a receive mode.

13 Claims, 1 Drawing Sheet

METHOD FOR AUXILIARY SOFTWARE PROVIDING INSTRUCTION FOR FACSIMILE MODEM TO SIMULATE A TELEPHONE COMMUNICATION WHILE CONNECTING TO STORE AND FORWARD COMPUTER TO RECEIVE COMMUNICATION

FIELD OF THE INVENTION

The present invention relates to an automated method and apparatus for communicating information between a remote computer and a personal computer. In particular, the invention relates to control and interaction of a computer modem and a software program used to control the computer modem which interaction is modified for a specialized communication protocol with the remote computer.

BACKGROUND OF THE INVENTION

A number of systems have been proposed for receiving and storing information at a remote computer with this information being available to an end user by accessing the computer using the Public Switched Telephone Network (PSTN). Electronic mail systems have been proposed on this basis and more recently facsimile transmission arrangements have utilized this method. In addition, an automated retrieval arrangement is disclosed in U.S. Pat. Nos. 4,713,837, 4,905,273, 4,922,518, 4,942,599 and 4,969,184, where it is possible to alert the destined receiver of a received facsimile by communicating therewith using a non-telephone signal whereafter the destined receiver completes a telephone communication with the remote computer and retrieves the received facsimile or other message type.

Many personal computers, in particular portable computers, are equipped with data or facsimile modems to accommodate transmission and reception of facsimiles. Typically the facsimile modem is connected to the computer via an RS-232 port, a PCMCIA port, the computer bus, or a specialized modem port. The facsimile modem typically communicates with a communication software application in the computer using one of these connections.

There are many modem manufacturers and the modem hardware varies and includes different capabilities. A specific communication software application is typically used with the facsimile modem for controlling the operation of the modem. The software application typically interacts with the modem and the computer during a data transmission or reception. The software application allows the user to send, receive, view, modify, annotate, manage, list, and forward facsimile messages within his PC.

In some circumstances, it is desirable to initiate a telephone communication with a remote computer for the purpose of retrieving facsimile messages. In such circumstances, the PC initiates a communication with a remote computer and the remote computer transmits information including facsimile messages back to the personal computer on the same call. This is in contrast to the common practise where the initiating PC transmits facsimile messages rather than receives facsimile messages. Some modems and associated software do allow a separate command to force the modem to a receive mode. With such software, the user is able to force the modem into a receive mode after having initiated an outbound call. Other modems and software do not allow this to be accomplished and the modem may disconnect the telephone communication should it be forced into a receive mode after having initiated an outbound call.

It would be desirable to provide a simple arrangement for allowing a computer with a facsimile modem to initiate communication with a remote computer via the modem and to then place the modem in a receive mode, regardless of the type of modem or type of facsimile software applications.

SUMMARY OF THE INVENTION

An auxiliary software application according to the present invention is loaded into a personal computer (PC) equipped with a facsimile modem and communication software for controlling of the facsimile modem. The auxiliary software application is capable of using the facsimile modem to form a telephone communication via the Public Switched Telephone Network (PSTN) with a remote computer and undertake the necessary interchange with the remote computer to select a particular facsimile compatible file for downloading into the PC. The auxiliary software application then simulates the effect of the facsimile modem sensing inbound ring signals on the telephone channel to which it is connected as if a normal inbound call was being received on the connected telephone channel and this simulated effect is communicated to the communication software for controlling of the modem within the PC. This simulated effect causes the communication software to behave as if a normal inbound call had occurred and to prepare the facsimile modem to accept the inbound facsimile file from the remote computer in the same manner as if the facsimile file was received from a remote facsimile terminal which had initiated the telephone communication with the modem.

The auxiliary software application described above can also work with respect to data modems for receiving of data files as opposed to facsimile files.

The auxiliary software application allows specialized communication between a PC and a predetermined remote computer via a modem. The auxiliary software application is able to simulate the effect of the modem sensing inbound ringing signals on the telephone channel to which it is connected and causes this simulated ringing condition to be received by a communication program normally used to control the modem communication within a PC. This received simulated effect causes the modem control program to behave as if a normal inbound call had occurred. In this way, the auxiliary software application is able to provide an input to the communication software, which input results in the modem being placed in a receive mode. The auxiliary software application uses the modem to initiate contact with the remote computer, exchange information therebetween to determine certain information to be downloaded to the PC. Once this is determined, the simulated effect is produced and the communication software then receives the facsimile message.

The auxiliary software application may create a virtual device which appears to the communication program, as the actual physical input/output port used by the normal communication software application to communicate with the modem or other communication device. In fact, the normal communication software application is communicating with virtual device software which simulates some or all of the behaviour of the physical port.

It is possible to simulate an inbound ring signal through the virtual device software writing the message string (typically "R", "I", "N", "G", repeated) to the normal communication software application which will react exactly as if an inbound call had occurred on the telephone line connected to the modem.

It is possible to simulate an inbound ring signal by writing characters to the actual physical port to which the modem is connected after first ensuring that the modem has been placed in a state whereby it will echo characters back to the physical port, which were sent to it from the physical port where the characters written to and hence echoed back from the physical port are the same characters which the modem would transmit into the physical port when it senses an inbound ringing signal on the telephone channel to which it is connected. This same effect can be accomplished by the auxiliary software placing the physical port hardware in a loopback condition in which characters written to the port are echoed back, regardless of the state of the connected modem.

According to a further aspect of the invention, a simulated inbound ring signal is accomplished by the auxiliary software forcing status bits and interrupts in the physical port to behave as if an inbound ring signal was detected on the telephone channel to which the modem is connected.

It is also possible to automate the retrieval of facsimile files by providing a separate signal receiver arrangement associated with the computer for receiving an actuation signal and when an actuation signal is received, the auxiliary software application places a call to the remote computer and simulates an inbound call on the telephone channel connected to a modem and results in the automatic retrieval of information. This signal can include an address of the particular receiver and thus the receiver will only retrieve the information when its particular address is received. This arrangement is particularly useful as part of a predetermined arrangement using a known telephone number associated with a computer which receives information on behalf of a known subscriber.

This non-telephone signal can be provided to the PC over any medium including cable television networks, power line carriers, local area networks, cellular telephones, personal communication systems, paging services, radio stations, side channels, telephone channels, television scan lines, or any other broadcast transport medium.

In some limited cases, certain modems are difficult to reverse and when it is attempted to force them from a transmit mode to a receive mode, the modem briefly goes on hook, thereby dropping the present call. A simple solution to this problem is to replace the modem with a modem that can be instructed to enter a receive mode without going on hook. Another solution is to use a device which connects between the modem and the telephone channel and introduces a brief delay before going on-hook. For example, when the modem initially enters the on-hook condition, the device simulates the off-hook condition to the PSTN for a short predetermined time period before allowing an actual on-hook condition of the modem to be recognized by the PSTN. Therefore, the modem must be on-hook for at least the short predetermined time period before the attached telephone channel will be recognized by the PSTN as being in an on-hook state. With such a device, it is possible during the short predetermined time period to send a signal to the modem indicating that a transmission is coming in and cause the the modem to connect, according to its normal protocol, with the initial telephone connection being maintained by the device. In this way the actual telephone channel that was first initiated is maintained by the separate device. The modem has cycled from an initial off-hook state transmit mode to an on-hook state to an off-hook receive mode.

For a telephone system which has pulse dialing, the device, according to a preferred aspect of the invention, must allow the normal dialing pulses to pass therethrough. In this case, when the modem enters the on-hook condition for a period of time less than a first specified time, the device creates an on-hook condition to the telephone channel for a third specified time period approximately equal to the pulse length used in the PSTN pulse dialing. The device will then simulate the off-hook condition to the telephone channel for a second specified time period thereby assuring that the modem must be on hook for at least the first specified time period before the attached telephone channel will be recognized by the PSTN as being in an on-hook state, while allowing the short on-hook state created by pulse dialing to pass through the device to the PSTN.

An auxiliary software application, according to the present invention, is resident within a personal computer (PC) equipped with a facsimile modem. The software application program is capable of directing the modem to place an outbound call via the PSTN to a remote computer, enter into an exchange of information with the remote computer in order to identify facsimile files to be downloaded into the PC and then force a facsimile modem, which may be in a transmit mode as a result of initiating an outbound call, to change to a receive mode and receive a facsimile file without causing the modem to momentarily enter an on-hook condition or otherwise terminate the current call.

An auxiliary software application according to a further interpretation of the invention, resides within a personal computer (PC) equipped with a facsimile modem. The auxiliary software application is capable of directing the modem to place an outbound call over the PSTN to a predetermined remote computer and then have the facsimile modem enter a receive mode even though the facsimile modem placed an outbound call which normally precedes the sending of a facsimile file from the PC. The facsimile modem is forced to enter a state in which it is capable of receiving a facsimile file without first having the modem enter an on-hook condition or otherwise terminate the current call.

It has been found, by the present inventors, that an auxiliary software application can be included with a PC to allow a customized interaction between conventional communication software and the facsimile modem. This auxiliary software application in a preferred embodiment allows a first communication to be initiated with a remote computer and a review of certain files within the remote computer and then the selection of a certain file or files to be downloaded to the PC. The software then simulates the effect of a ring condition or causes the normal communication to behave as if a ring condition has been received and this normal communication software then instructs the hardware of the modem to enter a receive mode. In this way a communication is initiated by the PC and eventually results in the receipt of certain information. With this approach the auxiliary software application can allow effective review and interaction with the remote computer and once it has been determined what information is to be received by the personal computer it can then interact with the communication software to cause that software to believe that a ring signal has been received or to activate the software and cause it to instruct the modem to go into a receive mode. The telephone communication between the modem and the remote computer is maintained and the subsequent processing of the received information is handled by the communication software according to its own standards and in accordance with its normal practice. Therefore this auxiliary software application allows customizing of the communication with the remote computer followed by the normal handling of an inbound facsimile of determined information to be received by the PC from the remote computer.

The invention has been described as an auxiliary software application run in conjunction with the communication software application of the modem. This auxiliary software application can obviously be added to the communication software application to allow this specialized communication, if desired.

BRIEF DESCRIPTION OF THE DRAWINGS

The preferred embodiments of the invention are showing in the drawing, wherein.

DETAILED DESCRIPTION OF THE PREFERRED EMBODIMENTS

Figure 1:
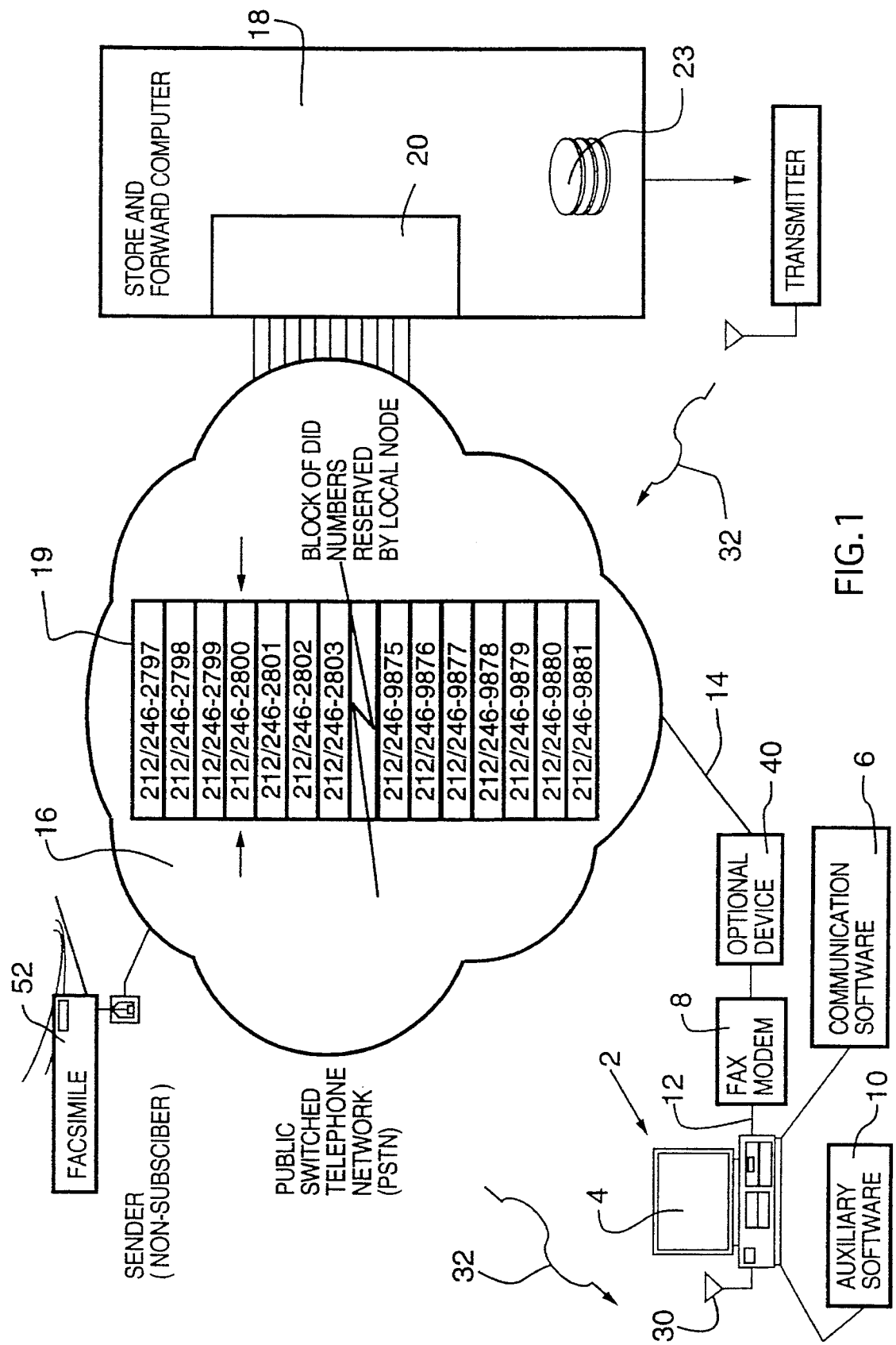
FIG. 1 shows a schematic of the system.

A personal computer (PC) 2, as shown in FIG. 1, has a display screen 4 and communication software application 6 and auxiliary software application 10. The PC is connected by a communication cable 12 to facsimile modem 8. The facsimile modem 8 is connected to the telephone channel 14 which is part of the Public Switched Telephone Network (PSTN) generally indicated as 16. A store and forward computer 18 is shown connected to the PSTN and this store and forward computer 18 includes its own communication protocol indicated as 20 which provides the necessary handshake to communicate with facsimile modems, facsimile machines, data modems, and other such communication devices and a specialized communication with such devices of a subscriber.

In addition, the personal computer 2 may include a separate receiver 30 which can receive a transmitted communication signal 32 containing an identity signal of the particular personal computer when required. The receipt of such a signal indicates a telephone communication with the store and forward computer should be initiated when possible.

The auxiliary communication software application 10 is advantageously used with portable computers in that these portable computers often have associated therewith facsimile modems but are not always connected to a dedicated telephone communication channel 14. From time to time, the facsimile modem will be connected with a telephone channel 14 but it may not be a dedicated line and it is not a telephone channel to which the portable computer is always connected. In order to allow such a PC to receive facsimiles and receive facsimiles in what would be considered to be a more or less normal manner, the store and forward computer 18 can receive transmissions on behalf of the portable computer 2 and store such facsimiles under an address code or mailbox of that particular portable computer 2.

When the user of the portable computer makes a connection with the telephone channel 14, the auxiliary software application 10 can be activated to initiate a specialized communication with the store and forward computer platform 18. The auxiliary software application 10 uses the facsimile modem to place a call over the PSTN to the store and forward computer 18 and communication protocol 20 exchanges information with the facsimile modem in the fields of the facsimile handshake protocol normally used to establish a communication between two modems. At that point, the auxiliary software application has advised the user of a summary listing of his particular mailbox and the user may have selected and advised the store and forward computer of certain information to be downloaded to the PC.

The auxiliary software then produces a signal that is received by the communication software 10 indicating an incoming telephone signal is being received, even though the connection with the store and forward computer is being maintained. The communication software instructs the modem 8 to receive the transmission and thereby connects with the store and forward computer and results in the downloading of the desired information.

Each store and forward computer has Direct In-Dial (DID) trunk lines and has the following capabilities:

1. To answer incoming calls on the DID trunk;
2. To receive and process the DID digits transmitted by the PSTN;
3. To undertake a data exchange with the calling terminal using Dual-Tone Multi-Frequency (DTMF) or other information signalling means;
4. To receive a facsimile from a remote facsimile terminal which has called the store and forward computer and to save the received data in a specified facsimile mailbox, where the mailbox is typically a disk file and the disk file is addressed by means of the dialed digits communicated by the PSTN or contained within a sub-addressing field forming part of the facsimile communication protocol; and
5. To transmit a file as a facsimile to a remote facsimile terminal which has called into the store and forward computer.

The store and forward computer is able to provide a fixed telephone number to each of a multiplicity of facsimile-equipped PC, and in conjunction with the auxiliary software application 10 in each PC, the store and forward computer is able to deliver received facsimiles thereto, regardless of the telephone access point to which the PC is connected at the time.

The operation of the information exchange is generally as follows:

1. Each facsimile-equipped PC 2 is assigned a specific number from the block of DID numbers 19 which terminate at the store and forward computer 18, or a sub-addressing field value that identifies the PC.
2. The retrieval of a facsimile by the PC first requires that the auxiliary software application instruct the facsimile modem to call a specific number that terminates at the store and forward computer 18.
3. The store and forward computer accepts the inbound call and identifies that a facsimile-equipped PC seeks to communicate with the store and forward computer 18. The auxiliary software application 10 preferably sends, via the modem, a unique identity and a PIN (Personal Identification Number) to the store and forward computer in one of the facsimile fields of the handshake protocol, or using DTMF signalling.
4. The store and forward computer in one of the various fields associated with the handshake protocol provides a summary of facsimiles in the particular mailbox.
5. The auxiliary software application, if the user wishes to review all or some of the files, then identifies the information to be sent and transmits this in one of the facsimile handshake fields. The auxiliary software application, while the telephone channel is maintained, simulates a "ring" condition to the communication software 6 in the PC. The communication software acts as if a conventional incoming communication is being received and places the modem in a receive mode.

6. The store and forward computer 18 is then able to transmit the identified data files to the facsimile-equipped PC as an incoming facsimile to the PC.

7. Billing data is updated for the appropriate account within the store and forward computer.

Whenever the facsimile-equipped PC calls into the store and forward computer 18, the PC sends identifying information and preferably a security code to the store and forward computer 18. This information allows the store and forward computer to identify the facsimile mailbox which is assigned to the particular facsimile-equipped PC, and to transmit information identifying the contents of the mailbox. This identifying information can be sent to the store and forward computer in several different formats, including:

1. Within the Called Subscriber Identification (CSI) field, which forms part of the data interchange between facsimile terminals prior to the actual transmission of the first image data, or 2. Within a specified formatted data block which adheres to standard facsimile format for a graphic page image, but which contains information other than a graphic image. This data block, or Encoded Data Page (EDP), will be accepted by facsimile-compatible hardware or software, but its contents will be interpreted by the receiver as specific data fields, rather than a graphic image.

These embedded information fields are used by the facsimile-equipped PC to transmit to the store and forward computer information including:

1. The unique identity of the facsimile-equipped personal computing device (for example, its account number and/or assigned DID number);

2. Security information, such as a dynamically changing identifier or Personal Identification Number (PIN), which helps assure that the facsimile-equipped PC seeking to retrieve from a particular facsimile mailbox is, in fact, the legitimate recipient;

3. Identification of facsimile files to be sent from the store and forward computer to the PC.

Likewise, the store and forward computer platform uses the facsimile-compatible data fields to send information to the facsimile-equipped PC including:

1. A description of the mailbox contents, including the number of documents to be delivered, the length and type of each document, and the CSI for each document. Therefore, before delivery starts, the receiver can select which documents he wishes to retrieve and which can remain in the mailbox or be forwarded elsewhere; and 2. Miscellaneous account information.

The auxiliary software application within the facsimile-equipped PC is capable of sending identifying information (such as assigned facsimile number, security code) to the store and forward computer, and of interpreting information sent to it by the store and forward computer (such as mailbox contents description, account information).

In the event that such information is contained within the CSI, the auxiliary software application of the PC creates a specific CSI when retrieving from the store and forward computer (typically containing assigned DID number, account number and security code). However, when transmitting facsimile-compatible data from the facsimile-equipped PC to a remote recipient, the communication software application in the facsimile-equipped personal computing device will create a CSI appropriate for display on the remote facsimile terminal (typically containing only the assigned DID number and/or sender identifier).

From the above, it is evident that the auxiliary software application 10 operates to conduct an initial communication with the store and forward computer 18 via the facsimile modem 8 and while this communication is maintained, i.e. the telephone channel 14 remains open, the auxiliary software application, simulates a signal to the communication software application 6 to cause it to act as if the facsimile modem had indicated that an incoming call is being received whereby the communication software then places the facsimile modem in a receive mode and acts in its normal manner. The store and forward computer 18 can then download the designated file which is handled by the facsimile modem software 6 in the normal manner.

With this arrangement the PC has conducted a specialized communication with the store and forward computer platform and exchanged information there. The auxiliary software application has also worked as an intermediary between the communication software and the facsimile modem to allow receipt of information when in fact the facsimile modem has been used to originate a communication with the store and forward computer.

The system as described takes advantage of the normal facsimile fields to communicate information between the PC and the store and forward computer. The fact that each PC must contact the store and forward computer allows the communication therebetween to depart from the standard practise and to transmit information therebetween in a nonconventional manner within conventional fields of a facsimile transmission.

It is also possible to have the PC transmit by a facsimile the identification of information in its mailbox to be delivered prior to simulating the ring condition to the communication software.

An improvement can be made to the system of FIG. 1 by providing a receiver 30 which can receive the communication signal indicated as 32. Such a signal can be forwarded to the PC when a facsimile has been received and thus the receiver 30 can then instruct or notify the PC to complete a telephone communication as soon as possible or to alert the user of the PC that a facsimile has been received. This arrangement is also suitable for conventional PC's which do not have a fixed or dedicated telephone channel 14. Thus they can share a telephone channel 14 and merely seize the channel 14 when the line is available and when a signal 32 has been received indicating that a facsimile is to be retrieved.

The manner in which the auxiliary software application 10 simulates an inbound ring signal to the normal communication software can be accomplished in many different ways. The auxiliary software can place the modem or the physical port in a state whereby it will echo characters back, and can write characters to the actual physical port to which the modem is connected. With this approach, the additional software writes characters to the port, which are the characters that the modem software recognizes as indicating an inbound ring signal on a telephone channel. The modem or port echos these characters back to the normal software, which thereby assumes that an inbound ring signal has been received. The additional software can also force status bits and interrupts in the physical port to behave as if an inbound ring signal was detected on the telephone channel to which the modem is connected. This same effect can be accomplished by the auxiliary software placing the physical port hardware in a loopback condition in which characters written to the port are echoed back, regardless of the state of the connected modem.

The most common approach is for the auxiliary software application 10 to simulate an inbound ring signal by writing the message string "R", "I", "N", "G" repeated to the normal communication software program which will react exactly as if an inbound call had occurred on the telephone channel connected to the modem. Any other message string which achieves this result can be used.

The system of FIG. 1 without optional device 40, operates satisfactorily with many of the modems now offered in the marketplace. However, there are a number of modems which due to the configuration of the facsimile modem go on-hook and drop the telephone channel when manipulated in the manner discussed. With such a system it is possible to include device 40, which is intermediate the facsimile modem 8 and the telephone communication channel 14. This device serves to maintain the telephone channel 14 when the facsimile modem 8 goes on-hook and will only drop the call after the modem has been on-hook for a certain predetermined time period (typically less than one second). This allows the auxiliary software application 10 to produce a signal that simulates to the communication software application 6 that an incoming call has been received and then allow the modem software to interact with the facsimile modem and device 40 to maintain the connection between the facsimile modem to the telephone channel 14. The device 40 serves to maintain the telephone communication channel 14 in an off-hook state for a predetermined time period, even though the facsimile modem has briefly entered an on-hook state and this device can simulate to the PSTN the off-hook state. With this arrangement the telephone channel 14 is maintained while the auxiliary communication software 10 manipulates the communication software application 6 and the facsimile modem 8 to allow connection again to the channel 14 and in a state to receive a selected file from the store and forward computer 18.

The application has also been described with respect to the actuation signal which can be received by receiver 30. This actuation signal can be received over any medium, including cable television networks, power line carrier, local area networks, cellular telephones, personal communication systems, paging services, radio station side channels, telephone channels, television scan lines or any other broadcast transport medium. Preferably, this signal is received over a broadcast medium which merely provides the address of the particular personal computer in the broadcast signal. The receiver then receives the signal and monitors the signal for its address. This arrangement works particularly well with free air broadcast signals, but the other approaches are also acceptable.

The invention has also been described with respect to the user making the decision to retrieve the information at different points in time, however, the auxiliary software application, once the personal computer is activated, can include an automatic retrieval function which would be activated whenever an actuation signal is received by receiver 30. This could only be enabled or fully functional when the personal computer is connected to a telephone channel 14.

Telephone channel 14 can include connection to the PSTN, cellular, PCs, or any other switched communication service.

The auxiliary software application 10 allows a simple arrangement for providing a specialized communication with a known store and forward computer. Thus it can be specialized for this particular application without rewriting the traditional communication software 6. This auxiliary software application or subprogram can activate the communication software and cause it to force the facsimile modem to assume a receive mode.

This auxiliary software application can also include instructions and forms for simplifying signing onto this service and to simplify the communication steps for contacting the appropriate store and forward computer.

It can be appreciated this additional program can be included as a specialized communication function of the facsimile modem software, if desired. The rewriting of the program could take advantage of any capability to cause to facsimile modem hardware to assume the receive mode.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. In combination a personal computer having an auxiliary software application, conventional communication software used in association with transmission and receiving of facsimile information via a facsimile modem associated therewith, and a store and forward computer accessible by telephone communications; said auxiliary software application, when activated, providing instructions to said facsimile modem to initiate a telephone communication with a predetermined telephone address of said store and forward computer, and after completion thereof, said auxiliary software application creates and transmits an activation signal to said conventional communication software, simulating a telephone communication is being received by the facsimile modem, whereafter said conventional communication software provides the normal signals for controlling the facsimile modem according to the standard protocol, whereby the facsimile modem and said conventional communication software assume a state for receipt of a communication from the store and forward computer connected to the facsimile modem, which connection was initiated by said auxiliary software application.

2. In combination as claimed in claim 1, said auxiliary application software including the capability to receive summary information of information destined for the personal computer and the capability to select any portion thereof for transmission to the personal computer via the communication from the store and forward computer prior to creating and transmitting the activation signal received by the conventional communication software indicating a telephone communication is being received.

3. In combination as claimed in claim 1 wherein said auxiliary software application is included as part of said conventional communication software.

4. In combination as claimed in claim 1 wherein said auxiliary software application includes an initial sign on procedure to enroll the personal computer with said store and forward computer.

5. In combination as claimed in claim 1 wherein said auxiliary software application includes a personal computer identification procedure at the start of a communication between said auxiliary software application and said Store and forward computer which includes communication of a PIN (Personal Identification Number) which PIN when properly matched with a reference code maintained by said store and forward computer allows review of the file of the user.

6. An auxiliary software application in combination with a personal computer having a facsimile modem said auxiliary software application when activated uses the personal computer and said facsimile modem to initiate a communication with a predetermined store and forward computer at a particular telephone address and uses the fields of a facsimile handshake protocol to identify the personal computer to the predetermined computer and to receive from the predetermined computer a summary of facsimiles received by the predetermined computer destined for the personal computer, and wherein said auxiliary software program, after communication with the predetermined computer of the facsimiles to be transmitted, produces a signal received by conventional communication software associated with the modem simulating that the modem is receiving an incoming communication and to act in the normal manner to answer the incoming communication and prepare for receipt of a facsimile transmission from the predetermined computer while the modem remains connected to said predetermined computer such that the modem and software assume a state for receipt of a facsimile transmission.

7. An auxiliary software application as claimed in claim 6 wherein said auxiliary communication program produces the message string "R" "I" "N" "G" or "R" "I" "N" "G" (repeated) or other message normally sent to the communication software when an incoming call is detected as said signal.

8. An auxiliary software application as claimed in claim 7 wherein said message string is echoed by the modem and subsequently received by communication software associated with the modem.

9. A method of receiving a facsimile transmission destined for a facsimile arrangement which has been assigned a telephone facsimile address and where said facsimile arrangement comprises a computer, a facsimile modem, communication software used to process facsimile transmissions received by the facsimile modem, and auxiliary communication software; said telephone address when used results in a communication with a facsimile mailbox of a store and forward computer which is accessible by telephone for retrieving facsimiles, said method comprising assigning the facsimile arrangement a telephone facsimile address, causing said facsimile arrangement to originate a telephone communication with the store and forward computer using said auxiliary communication software and said facsimile modem of the facsimile arrangement, said store and forward computer transmitting to said facsimile arrangement a summary of the contents of the mailbox in a field of the handshake facsimile protocol, said facsimile arrangement identifying to said store and forward computer certain information in the mailbox to be transmitted to the facsimile arrangement and thereafter said auxiliary communication software produces a signal causing said communication software to act as if a telephone communication is being received by the facsimile modem while the facsimile modem is connected to the store and forward platform and thereby automatically place said facsimile modem in a receive mode, said store and forward platform then transmitting the identified information in the mailbox to the facsimile arrangement prior to termination of the telephone communication originated by the facsimile arrangement.

10. A method as claimed in claim 9 wherein said facsimile arrangement during the handshake protocol communicates its identity as well as a security code.

11. A method as claimed in claim 9 wherein said auxiliary communication software writes the message string "R" "I" "N" "G" to the communication software to cause the communication software to act as if a telephone communication is being received by the facsimile modem.

12. A method as claimed in claim 9 wherein said auxiliary communication software writes the message string "R" "I" "N" "G" repeated to the communication software to cause the communication software to act as if a telephone communication is being received by the facsimile modem.

13. An auxiliary software application in combination with a facsimile arrangement having a facsimile modem and communication software for transmitting and receiving facsimiles via the facsimile modem, said auxiliary software application being capable of using said facsimile modem to complete a telephone connection with a store and forward computer and exchange information therewith using facsimile protocol and including means for producing a signal, when connected via the modem to the store and forward computer, simulating an incoming communication is being received by the facsimile modem causing said communication software to act as if a telephone communication is being received by the facsimile modem and thereby place said modem and communication software in a state for receipt of a facsimile transmission.

* * * * *